United States Patent [19]

Bevacqua et al.

[11] Patent Number: 4,861,287

[45] Date of Patent: Aug. 29, 1989

[54] TELEPHONE NETWORK MULTIPLE TRANSMISSION LINE INTERFACE

[75] Inventors: Joseph P. Bevacqua, Paterson, N.J.; Robert E. Eastep, Walkerville, Md.; Thomas J. Collins, Wall, N.J.

[73] Assignee: Bell Atlantic, Washington, D.C.

[21] Appl. No.: 158,325

[22] Filed: Feb. 19, 1988

[51] Int. Cl.[4] .............................................. H01R 9/24
[52] U.S. Cl. ...................... 439/718; 439/719
[58] Field of Search ................ 439/76, 142, 544, 709, 439/712, 713, 718, 719, 49

[56] References Cited

U.S. PATENT DOCUMENTS

| | | | |
|---|---|---|---|
| 3,660,802 | 5/1972 | Staudt | 339/126 R S |
| 3,760,328 | 9/1973 | Georgopulos | 339/198 |
| 4,131,330 | 12/1978 | Stupay | 339/125 R |
| 4,195,194 | 3/1980 | Kuster et al. | 339/198 R |
| 4,335,929 | 6/1982 | Abernethy | 339/176 M |
| 4,463,999 | 8/1984 | Knickerbocker | 439/369 |
| 4,488,008 | 12/1984 | Dellinger et al. | 339/126 R |
| 4,500,158 | 2/1985 | Dola | 339/122 R |
| 4,536,052 | 8/1985 | Baker et al. | 339/126 R |
| 4,550,964 | 11/1985 | Donais et al. | 439/491 |
| 4,641,900 | 2/1987 | Japngie | 439/76 |
| 4,651,340 | 3/1987 | Marson | 339/198 |
| 4,729,059 | 3/1988 | Wang | 439/709 |
| 4,749,359 | 6/1988 | White | 439/718 |

OTHER PUBLICATIONS

Brand-Rex Patch Panel Brochure.
Brand-Rex Adapters/Blocks Brochure.
Keptel SNI-550 Network Interface System Brochure.
Keptel ML-5 Brochure.
*Nevada Western, Connections Systems Division*, Sunnyvale, Calif., pp. 8, 16 and 31.
"Network Blueprint Notes", *Armiger Corporation*, Fort Worth, Tex., publication No. AA-600-164.
"Network Blueprint Issue I", *Armiger Corporation*, Fort Worth, Tex.

*Primary Examiner*—Neil Abrams
*Attorney, Agent, or Firm*—Lowe, Price, LeBlanc, Becker & Shur

[57] ABSTRACT

An integral multiple transmission line interface comprises a panel having opposite side portions defining, facility connection and subscriber connection regions having, respectively, a facility cable connector and subscriber cable terminals. A plurality of spaced modular jacks are arrayed longitudinally along the facility connection region of the panel, and a plurality of removably attached subscriber wiring bridges extend between the jacks and subscriber cable terminals. Interconnection between the subscriber wiring bridges and the facility cable connector is made through a printed circuit board within the panel. A pivotally mounted, removable cover protects the subscriber wiring terminals from human contact, and interlocking ears and collars formed on the panel enable the terminal devices to be stacked end to end.

11 Claims, 6 Drawing Sheets

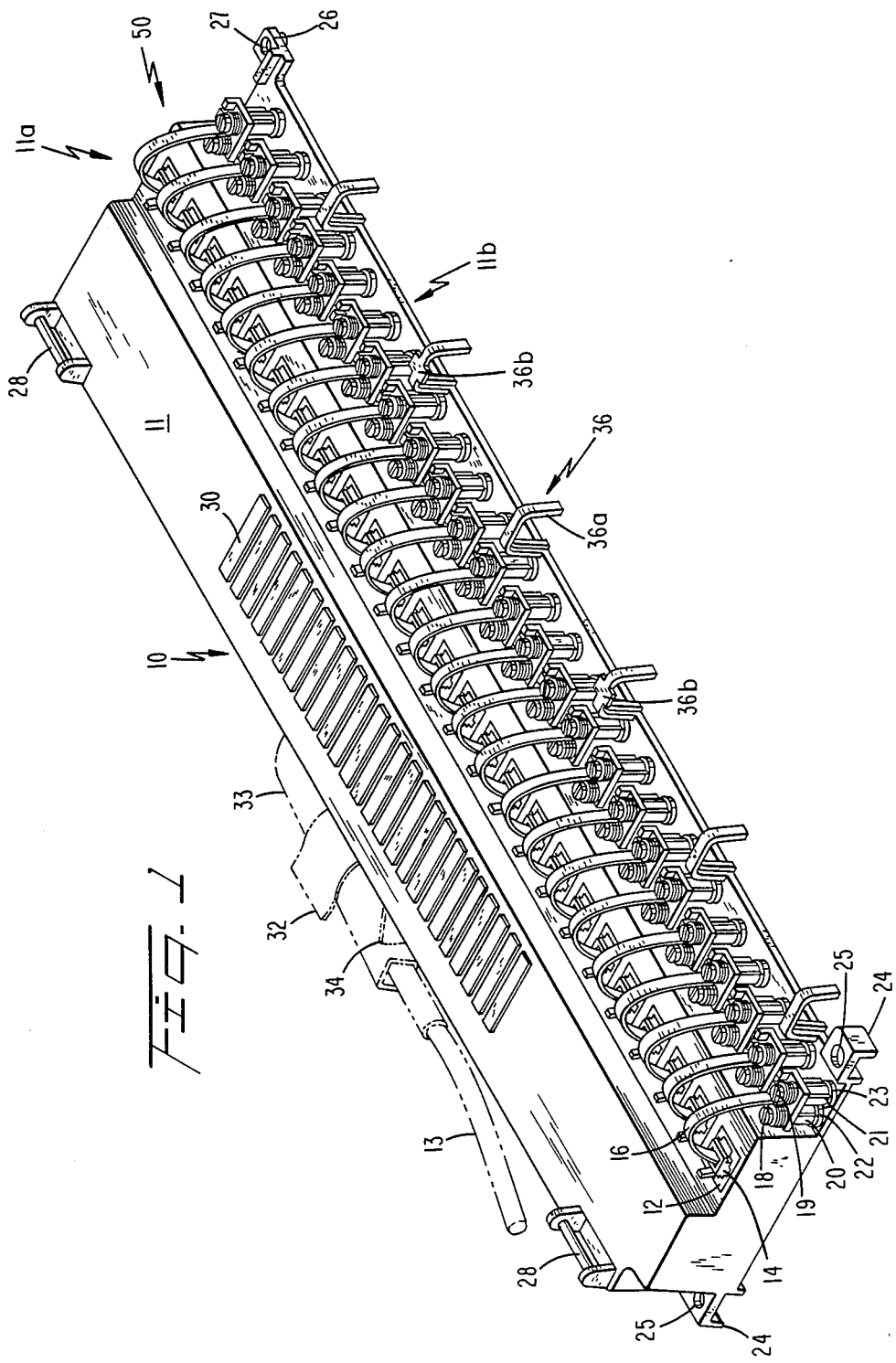

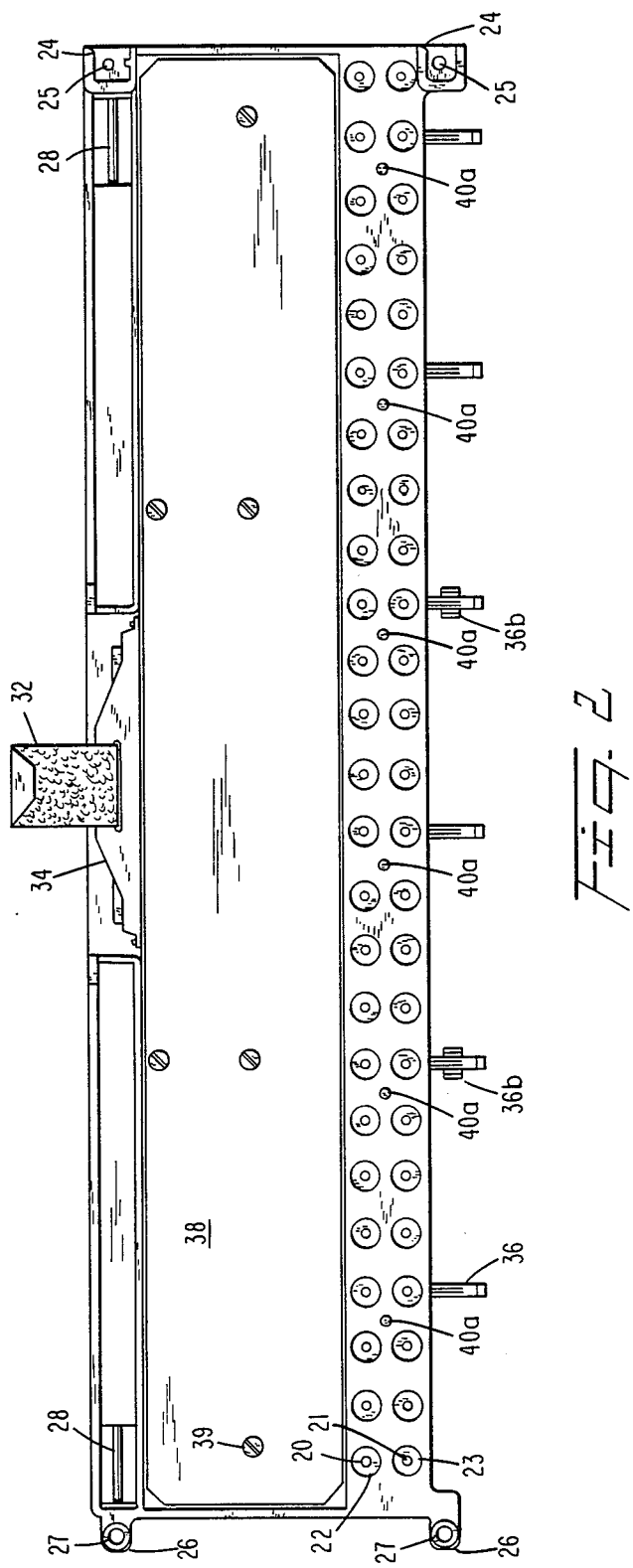

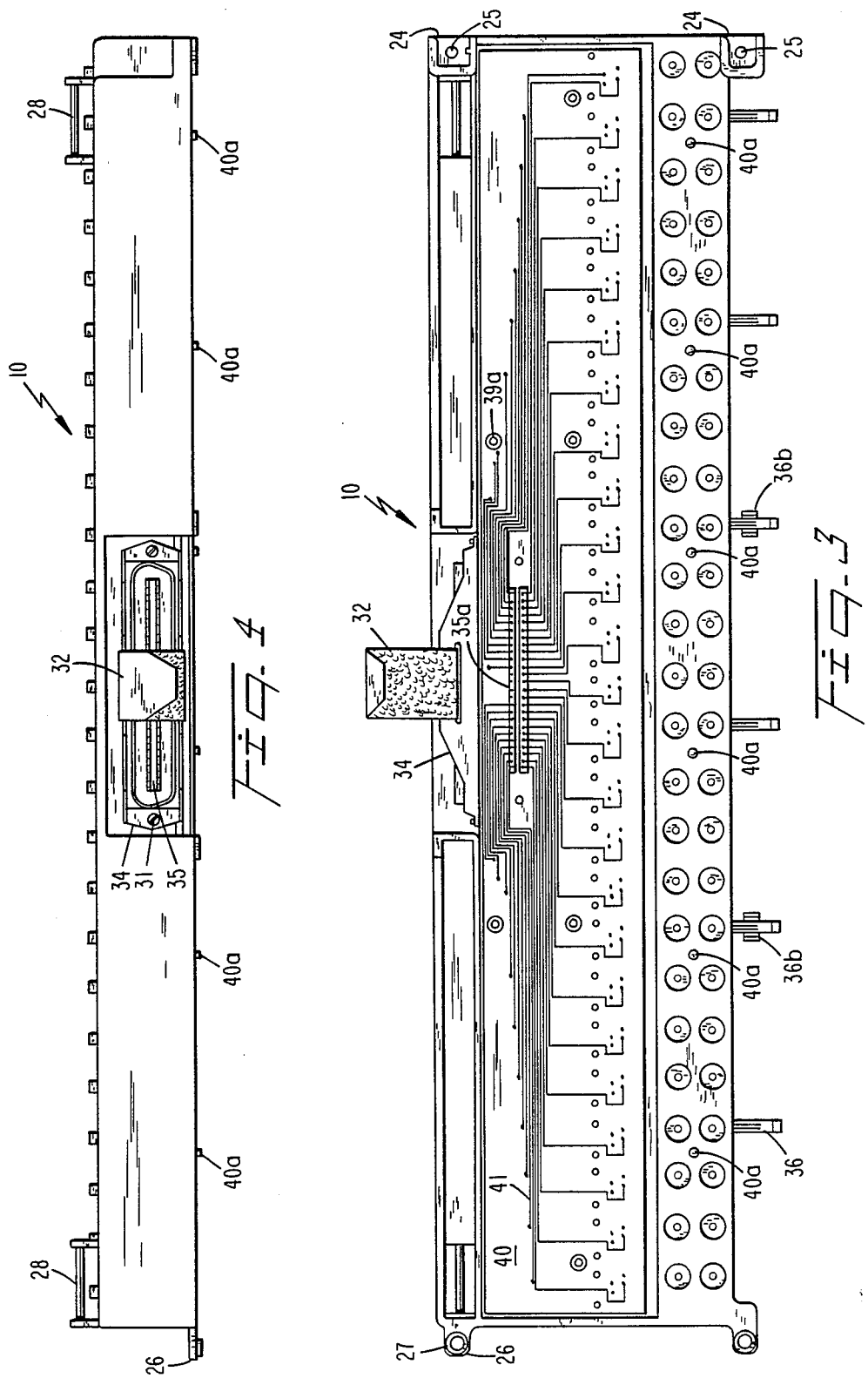

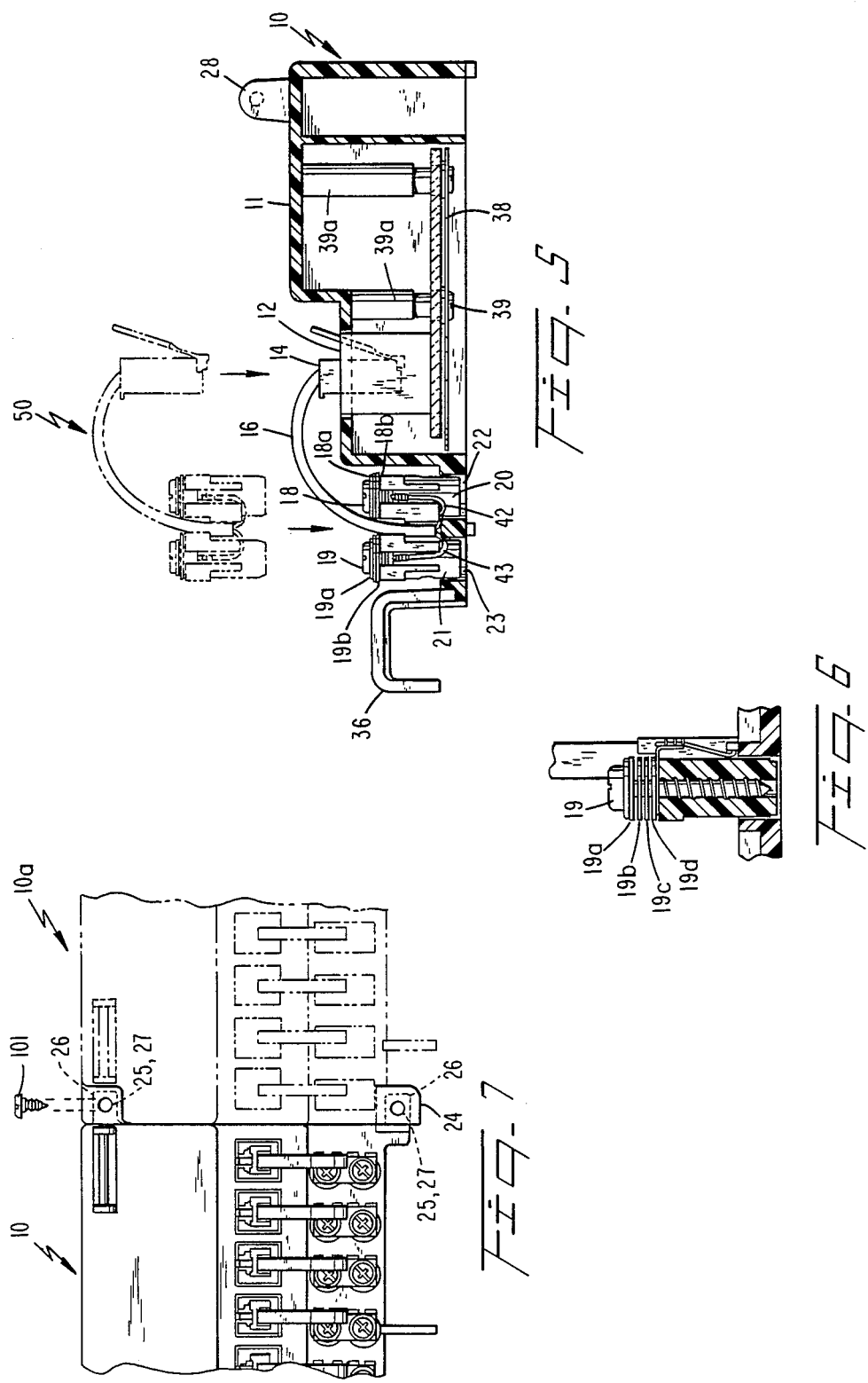

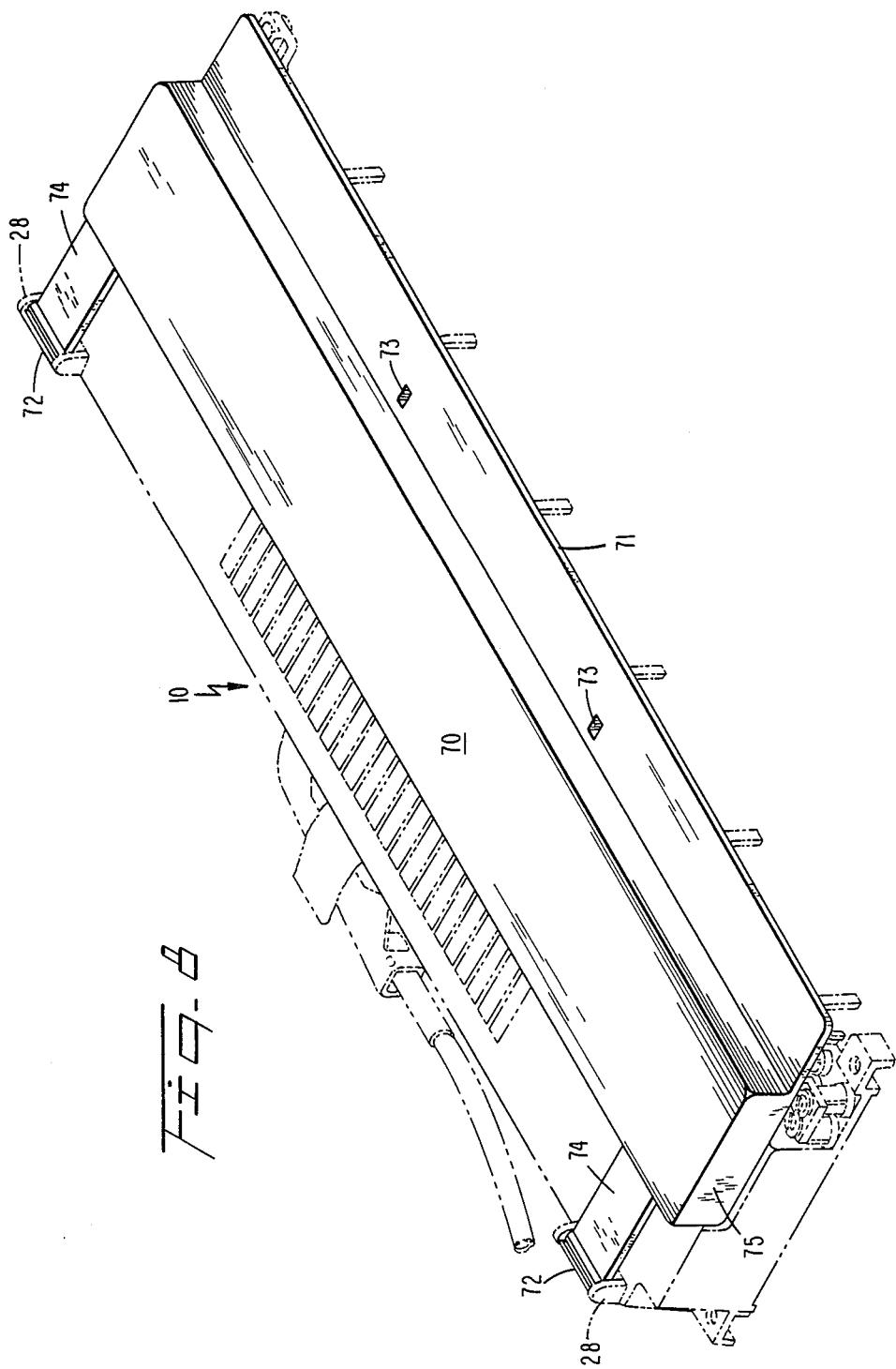

TELEPHONE NETWORK MULTIPLE TRANSMISSION LINE INTERFACE

BACKGROUND OF THE INVENTION

1. Field of the Invention

The present invention relates generally to telephone interfaces and more particularly to telephone network multiple transmission line interface forming a demarcation point between telephone company and subscriber premise wiring.

2. Description of the Prior Art

With the divestiture of the American Telephone and Telegraph Corporation, the Federal Communications Commission (FCC) mandated the deployment of an instrument capable of serving as a demarcation point between the network wiring of the regional telephone company and that of the premise of the subscriber (customer). One intention of the demarcation point mandate is to provide a test point for the subscriber to troubleshoot each incoming line at the demarcation point and thus verify if a transmission problem is on the telephone network side or on the subscriber side of the demarcation point.

Heretofore, one type of conventional interface device accepts a standard 25 line telephone registration jack on the incoming network end, separate the incoming lines, and then routes them to individual single line telephone registration jacks. However, wiring between the facility network and subscriber premises equipment is not reliable and sometimes is malinstalled by the technician. Further conventional interface devices have not provided an integral means for connecting the premise wiring using a common method, e.g., by terminal screws, used both by telephone network personnel and subscribers. Further, conventional interface devices do not allow connection of more than one subscriber conductor pair to each interface device, nor have provisions been made for removable customer interface terminals.

Conventional interface devices have no provisions for mechanically interlocking a plurality of interface devices for ease of testing or to minimize installation space requirements in installations having a large customer premise equipment population, and no provisions are made to protect the terminals of the device from short-circuits.

Therefore, it is an object of the present invention to provide multiple transmission line interface terminal that overcomes the shortcomings of the prior art.

Another object is to provide a multiple transmission line interface terminal device wherein interconnections between facility and subscriber premises wiring are reliably provided, i.e., there are no wiring crossovers or other technician wiring errors.

Another object of the invention is to provide a telephone transmission line demarcation point between facility equipment and CPE utilizing removable subscriber wiring bridges that, upon failure, can be easily replaced in the field.

It is a more particular object of the present invention to enable utilization of screw terminals in a telephone transmission line interface for attachment of subscriber premise wiring, also known as customer provided equipment or (CPE), wherein a screw terminal is provided for each conductor of associated CPE tip and ring conductor pairs.

A further object of the invention is to enable connection of more than one pair of CPE tip and ring conductors on each subscriber wiring bridge of a telephone transmission line interface.

Another object of the invention is to provide a telephone transmission line interface terminal which enables mechanical interlocking of one terminal to another by interlockably stacking terminals end to end, enabling easy fault location and minimization of installation space requirements.

Yet another object is to provide, in a telephone network interface, a hinged removable reinforced front cover over the metallic terminals of the device to prevent possible short circuiting of one or more lines and protect the subscriber wiring bridges from dust and other foreign matter.

A further object of the invention is to provide selective interconnection of each subscriber wiring bridge with facility connections within a telephone network interface.

A still further object of the invention is to conveniently route CPE lines or cable of an integral cableway on the CPE side of an integral multiple transmission line interface terminal as well as to conveniently route facility lines or cable via a connector on the facility side of the terminal.

SUMMARY OF THE INVENTION

The above and other objects are satisfied in accordance with the invention by a multiple transmission line interface terminal, comprising a panel having opposite side portions defining, respectively, facility connection and subscriber connection regions. A facility cable connector and subscriber cable terminals are located at the facility and subscriber regions, respectively, of the panel, and a plurality of spaced modular jacks are arrayed longitudinally along the facility connection region of the panel. A plurality of subscriber wiring bridges have, at one end thereof, spaced apart modular plugs arrayed longitudinally along the subscriber connection region of the panel and, at an opposite end thereof, have subscriber terminal connectors. In accordance with one important aspect of the invention, a printed circuit board having an etched pattern of conductors interconnects the facility cable connector and the plurality of spaced modular jacks.

Preferably, the facility cable connector and subscriber modular jacks are mounted on the printed circuit board, and etched wiring on the board interconnects terminals of the connector and jacks. The jacks are exposed through the panel through openings formed therein, to receive subscriber modular plugs or other connectors for testing the lines. This structure provides a terminal that is substantially more reliable, compact and economically produced than terminals of the prior art.

In accordance with another aspect of the invention, panel interlock ears and collars are adapted for stacking the panel with another one of the panels end to end on a flat mounting surface. Apertures formed in the interlocking ears and collars allow insertion therethrough of any appropriate fastener, such as a screw, enabling the interlocking and stacked panels to be attached to the mounting surface.

Another aspect of the invention provides a removable reinforced cover pivotally mounted to the panel and positioned to enable the enclosure of the subscriber terminal connectors. The cover is releasably retained to a cableway formed integrally with the panel.

A still further aspect of the panel of the invention provides enablement of a carrier for erasably writing information, such as status of line connections, to be located on the panel.

Still other objects and advantages of the present invention will become readily apparent to those skilled in this art from the following detailed description, wherein only the preferred embodiment of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the following drawings and description are to be regarded as illustrative in nature, and not as restrictive.

BRIEF DESCRIPTION OF THE DRAWINGS

FIG. 1 is a perspective view of a multiple transmission line interface terminal provided in accordance with the invention;

FIG. 2 is a rear view of the interface terminal of FIG. 1 with its back cover installed;

FIG. 3 is a rear view of the interface terminal of FIG. 2 with its back cover removed to expose the underlying printed circuit board;

FIG. 4 is a side view showing the facility side of the interface terminal of the invention;

FIG. 5 is a cross-sectional view of the interface showing the insertion of a subscriber wiring bridge into the CPE side of the invention;

FIG. 6 is a cross-sectional view of a subscriber wiring bridge showing a mounting post and its associate screw terminal and wire compression washers;

FIG. 7 is a top view of two integral multiple transmission line interface terminals, interlockably stacked;

FIG. 8 is a perspective view of the interface with a hinged removable front cover, in accordance with the invention.

DESCRIPTION OF THE PREFERRED EMBODIMENT

Figure 9:
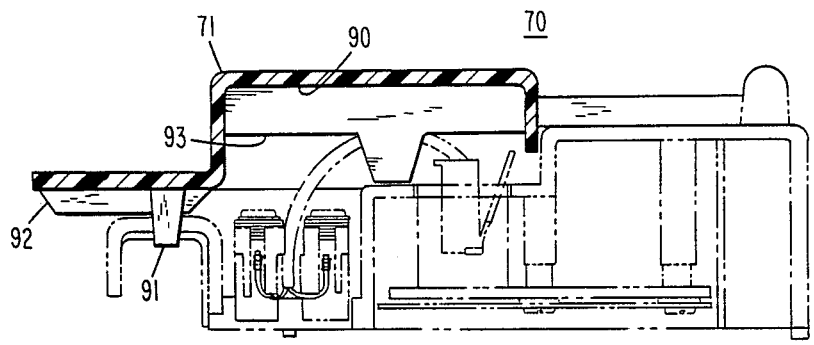
FIG. 9 is a cross-sectional view of the hinged removable front cover of FIG. 8 showing the protective standoffs and clips formed in the cover.

Referring to FIG. 1, a multiple transmission line interface terminal 10 of the present invention comprises an elongated rectangular panel 11, having a facility region 11a to which is coupled a telephone facility connector 34, and a subscriber region 11b having plurality of removable subscriber interface bridges 50 releasably retained within a plurality of facility interface connector jacks 12. At the telephone facility region 11a of the panel is a telephone facility entrance cable 13, comprising, e.g., 25 pairs of standard tip and ring conductors, mechanically and electrically engaging the integral multiple transmission line interface terminal 10 in a manner hereinafter described such that each facility interface connector jack 12 is provided with associated line tip and ring electrical conductors of proper polarities. Demarcation between telephone facility equipment and user connected CPE is accomplished by providing one subscriber wiring bridge 50 to each facility interface connector jack 12.

Each subscriber wiring bridge 50, shown more clearly in FIG. 5, comprises a modular plug 14, preferably compatible with the RJ11 standard, attached to a first end of a cable 16 comprising a pair of tip and ring conductors 42 and 43 respectively. The opposite end of cable 16 is terminated at screw terminals 18 and 19 which serve as the user tip and ring, or customer CPE connection point. Facility modular jacks 12, preferably compatible with the RJ11 standard, serve as the facility equipment connection point for CPE.

Subscriber wiring bridge 50 is attached to panel 11 by terminal mounting posts 20 and 21, inserted into respective terminal post mounting apertures 22 and 23 formed in a portion of the panel 11. With terminal mounting posts 22 and 23 inserted into their respective mounting apertures and secured, facility connector modular plug 14 is plugged into facility connector modular jack 12 to form the electrical "bridges" shown. Of course, removal of the bridge is easily accomplished by reversing this procedure. The ability to individually remove each subscriber wiring bridge 50 from integral multiple transmission line interface terminal 10 establishes a demarcation line between the facility equipment and CPE, and provides easy replacement of a subscriber wiring bridge if it becomes worn out or damaged in the course of customer use.

Facility modular jack 12 allows a customer to easily troubleshoot or test his or her telephone line by unplugging modular plug 14 from facility modular jack 12 and plugging any RJ11 compatible telephone device (not shown) into facility jacket 12. If the line is found to be normal, i.e. dial tone is attained and a telephone call can be made over the line, the problem lies in the customer's premises equipment. If the line is found to be abnormal, the problem lies within the telephone facility equipment.

Referring now to FIGS. 2-5 showing the interface between facility equipment and CPE in more detail, facility connector 34, preferably compatible with industry standard RJ21, is affixed to the facility side of the interface terminal 10 by screws 31. Facility connector 34 engages facility cable 13 through plug 33 (FIG. 1) and metallic contacts 35 (FIG. 4). Plug 33 is held in place by a section of filamentary hook and loop fastener material 32, such as Velcro.

Facility connector 34 is interconnected to the facility connector jacks 14 (FIG. 1) by a printed circuit board 40, shown in FIG. 3. Printed circuit lines 41, etched on printed circuit board 40, serve as conductive lines for connecting the tip and ring conductor pairs (not shown) provided by incoming facility cable 13, through contacts 35, to facility connector jacks 12. The incoming facility cable pair connections from contacts 35, shown in FIG. 4, are electrically connected to printed circuit board 40 at connection point 35a (FIG. 3), and are routed from a predesignated connection point at connection point 35a to their respective facility connector jacks 12 which are mounted directly on the board. The jacks 12 are exposed through the panel 11 at corresponding apertures 14a (FIG. 5) therein to receive modular plugs 14.

With reference now to FIG. 5 in more detail, printed circuit board 40 is held in place within multiple transmission line interface terminal 10 between printed circuit board mounting posts 39a and back cover 38 by affixing mounting screws 39 to circuit board mounting posts 39a once printed circuit board 40 and back cover 38 are in place within panel 11. As shown in FIG. 2, back cover 38, which is electrically non-conductive, protects printed circuit board 40 and its associated connections against possible damage or possible short circuiting of printed circuit lines 41 by external metallic objects. Further, as shown in FIG. 2, standoff nibs 40a, formed integrally with interface terminal 10 maintain a protective space between back cover 38 and a particular mounting surface.

When a facility connection is established through facility connector 34, connector contacts 35, printed circuit board 40, and facility connector jacks 12, and the proper tip and ring connections at facility jack 12 and screw terminals 18, 19 are assured, a customer or technician is enabled to install the subscriber line(s) (not shown) to the screw terminals 18, 19, in a conventional manner. For example, as shown in FIG. 6, when an installer (not shown) has ensured that screw terminal 19 allows sufficient space between wire compression washers 19a and 19b to enable the placement of a properly insulation stripper conductor (not shown) therebetween, the installer wraps the stripped portion of the conductor at least once around screw 19 in a clockwise direction between wire compression washers 19a and 19b. Screw terminal 19 is then rotated in a clockwise direction compressing the conductor between wire compression washers 19a and 19b thereby establishing mechanical and electrical interconnection between the customer premise equipment and the customer wiring bridge. According to usual practice, screw terminals 18 are designated the tip conductors, and screw terminals 19 are designated the ring conductors.

As further shown in the example of FIG. 6, screw terminal 19 is provided with a plurality of washers 19a-19d, allowing a multiplicity of customer lines connections to its subscriber wiring bridge.

The interface 10, according to another aspect of the invention, provides proper routing and maintenance of the installed customer lines through a cableway 36. As shown in FIG. 1, cableway 36 comprises a plurality of U-shaped fingers 36a formed integrally with panel 11. In a typical installation, a customer cable (not shown) or a plurality of customer lines (not shown) is routed through cableway 36 via fingers 36a and secured therein. For example, typical customer cable routing can be accomplished by placing each customer line or cable behind as many fingers 36a as the length of the customer line requires to reach and interconnect the lines to all respective subscriber wiring bridges 50. Successive cables to be routed are installed in a like manner, and the entire customer cable bundle (not shown) is secured inside cableway 36 behind and through U-shaped fingers 36a.

A typical installation environment of the integral multiple transmission line interface terminal 10 can include a customer installation with a large CPE population. In installations where more than 25 lines are to be interfaced and connected through interface 10 of the present invention, provision is made for mechanically interlocking or stacking a plurality of integral multiple transmission line interface terminals 10. Thus, with reference again to FIGS. 1-3, female stacking collars 24 with associated mounting apertures 25 are formed on a first end of panel 11, and corresponding male stacking ears 26 and associated mounting apertures 27 are formed on a second end thereof. Integral multiple transmission line interface terminals 10 and 10a are interlocked or stacked (FIG. 7) by insertion of male stacking ears 26 of one integral multiple transmission line interface terminal 10 into female stacking collars 24 of another integral multiple transmission line interface terminal 10a. Apertures 25 and 27 provided in the stacking ears and collars respectively are then aligned, allowing insertion of any appropriate fastening device such as screw 101 through aligned apertures 25 and 27 to secure the interlocked interface terminals in a desired installation location.

Figure 10:
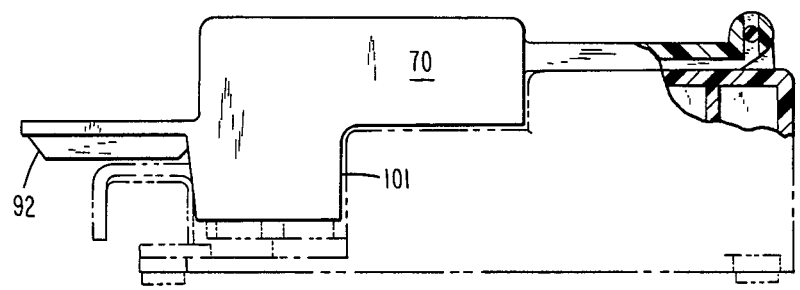
FIG. 10 is a top view of the interface with a hinged removable front cover, in accordance with the invention, showing protective standoffs and the top covering flange.
Figure 11:
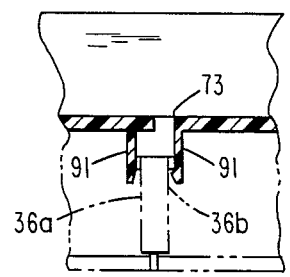
FIG. 11 is a cross-sectional view of the front cover of the invention showing mounting clips attached to tabs formed on the U-shaped fingers of the subscriber cableway.

To further protect the integrity of the integral multiple transmission line interface terminal 10 in a variety of installation environments a hinged reinforced front cover assembly 70 (FIG. 8) comprises front cover 71, mounting hinges 28 formed on the face of integral multiple transmission line interface terminal 10, and arcuate lips 72 formed on arms 74 extending from the front cover 71. Reinforced front cover assembly 70 is removably attached to panel 11 by positioning front cover 71 over the face of integral multiple transmission line interface terminal 10 with lips 72 behind hinges 28 and then swinging the cover 70 into place over subscriber wiring bridges 50. Reinforced front cover assembly 70 is thereby enabled to swing through a large arc of rotation providing complete access to the mounting bridges 50 for maintenance or installation when opened, and when closed, to provide protection from human contact. Resilient coupling members 91 extending from the cover 71 resiliently grip corresponding coupling tabs 36b formed on fingers 36a of cableway 36, to retain the cover closed, as shown in FIG. 11. Coupling apertures 73 formed in cover 70 aid in locating resilient coupling members 91. Front cover assembly 70 also includes a plurality of standoffs 92 and 93 formed on front cover 70 lower surface 90 that reinforce front cover assembly 70 and maintain wiring bridges 16 in place. Dust and other foreign matter are further kept out of the interface terminal of the invention by provision of dust cover flanges 101 (FIG. 10) and 75 (FIG. 8) formed integrally with cover 70.

Panel 11 and front cover assembly 70 are made of any suitable dielectric material, such as plastic. Notation areas 30 (FIG. 1) are molded into panel 11 to enable a technician or user to note installation information such as line number or customer name thereon.

As is clear from the foregoing, the integral multiple transmission line interface terminal 10 of the invention provides demarcation between facility equipment and customer premises equipment by the provision of subscriber wiring bridges. The bridges are preferably compatible with the RJ11 standard on the facility side of the bridge and allow subscriber or customer connection by pairs of screw terminals on the customer premises equipment (CPE) side of the bridge. Optionally, the pairs of screw terminals on the CPE side of the bridge can accommodate more than one CPE tip and ring pair. An integral cableway, formed on the CPE portion of the interface, allows utilization of efficient cable installation procedures. A hook and loop filamentary fastener is provided on the facility portion of the terminal, maintains the incoming facility cable connection to the facility equipment connector. A reliable interface between the facility connector modular jacks and the incoming facility cable tip and ring conductors is maintained by a printed circuit board having appropriate connections thereto and etched printed circuit lines routed to respective facility connector modular jacks. Overall integrity of the subscriber wiring bridges is maintained by a pivotally mounted removable reinforced cover. Installation space is minimized by mounting the facility cable connector and subscriber modular jacks directly on the printed circuit board, and also by stacking the terminals end to end for mounting on any appropriate surface. Overall integrity of the printed circuit board is maintained by providing a back cover. Standoff nibs formed beneath the subscriber connection region maintains distance between the back cover and a mounting surface.

In this disclosure, there is shown and described only the preferred embodiments of the invention, but, as aforementioned, it is to be understood that the invention is capable of use in other environments and is capable of changes or modifications within the scope of the inventive concept as expressed herein.

What is claimed is:

1. A multiple transmission line interface terminal, comprising:
   a unitary panel adapted to be mounted on a surface and having opposite side portions defining, respectively, facility connection and subscriber terminal regions;
   the side portion of said panel defining said facility connection region having wall portions disposed to form with said side portion a housing for said facility connection region, which housing opens in the direction of the surface upon which the panel is to be mounted;
   a facility cable connector means mounted on one of said portions forming said housing and extending thereinto;
   a plurality of spaced modular jacks arrayed longitudinally in said housing;
   a printed circuit board means have an etched pattern of conductors interconnecting said facility cable connector means and said plurality of spaced modular jacks, said printed circuit board means being disposed within said housing;
   a plurality of subscriber wiring bridges arrayed longitudinally in said subscriber terminal region, said subscriber wiring bridges comprising at one end thereof modular plugs and at opposite ends thereof screw terminal means;
   said modular plugs being received within said jacks, said plugs being releasably coupled to said jacks and having wires extending therefrom to said screw terminal means; and
   a unitary cover pivotally mounted to said panel and positioned to overlie said subscriber wiring bridges, said plugs, said screw terminal means and said wires.

2. The terminal of claim 1, wherein said cable connector means and said modular jacks are mounted on said printed circuit board means, and said panel has a series of openings formed therein, said jacks being exposed through said openings.

3. The terminal of claim 2 including cable retaining means attached to said panel in said subscriber terminal region and forming a cable way for subscriber wiring, said cable way having a longitudinal axis substantially aligned with the longitudinal array of subscriber wiring bridges; and
   said cover having a portion overlying said cable retaining means and having means extending therefrom for releasably fastening said cover to said cable retaining means to enclose said subscriber terminal connector means.

4. The terminal of claim 3, wherein hinges are provided on a surface of said panel, and said cover includes arms extending therefrom and retained by said hinges to provide said pivotal mounting for said cover on said panel said arms defining therebetween an open area through which said panel is exposed, and indicia means on said panel in the area exposed between said arms.

5. The terminal of claim 1, wherein said cover includes a main cover portion having cover wall portions extending substantially perpendicular thereto, and a plurality of stand-off ribs extending between said wall portions to reinforce said cover; said ribs having portions thereof extending between said wires to position said wires; said ribs having edge portions engaging the side portion of said panel defining said subscriber terminal region wherein said cover is in a closed position.

6. The terminal of claim 1, said panel having attached thereto at opposite ends thereof mounting means for attachment of said panel to the surface upon which it is to be mounted; said mounting means at one end of said panel being of a shape complementary to the shape of said mounting means at the opposite end of said panel to permit interlocking connection with similar shaped mounting means on additional panels disposed in line with said longitudinal arrays.

7. The terminal of claim 6 wherein said mounting means are disposed to support said panel in spaced relation to the surface upon which said panel is mounted.

8. A multiple transmission line interface terminal, comprising:
   an elongated panel having a longitudinal axis and opposed corners at opposite ends of said longitudinal axis, said panel being adapted to be mounted on a surface and having opposite side portions defining, respectively, facility connection and subscriber terminal regions;
   the side portion of said panel defining said facility connection region having wall portions disposed to form with said side portion a housing for said facility connection region, which housing opens in the direction of the surface upon which the panel is to be mounted;
   a facility cable connector means mounted on one of said portions forming said housing and extending thereinto;
   a plurality of spaced modular jacks arrayed longitudinally in said housing substantially parallel to the longitudinal axis of said panel;
   a printed circuit board means having an etched pattern of conductors interconnecting said facility cable connector means and said plurality of spaced modular jacks, said printed circuit board being disposed within said housing;
   a plurality of subscriber wiring bridges arrayed longitudinally in said subscriber terminal region substantially parallel to the longitudinal axis of said panel, said subscriber wiring bridges comprising at one end thereof modular plugs and at opposite ends thereof screw terminal means releasably mounted on said panel;
   said modular plugs being received within said jacks, said plugs being releasably coupled to said jacks and having wires extending therefrom to said screw terminal means in a direction substantially perpendicular to said longitudinal axis of said panel;

an elongated cover pivotally mounted to said panel and positioned to overlie said subscriber wiring bridges, said plugs, said screw terminals and said wires; and mounting means on said panel substantially at said opposed corners thereof; said mounting means at one end of said panel being of a shape complementary with the shape of the mounting means at the other end of said panel whereby a plurality of said panels may be mounted in interlocking fashion with said respective complementary locking means of one panel disposed in mating fashion with the complementary shaped mounting means of the next panel.

9. The terminal of claim 8 wherein said cover includes a main cover portion having cover wall portions extending substantially perpendicular thereto, and a plurality of standoff ribs extending between said wall portions to reinforce said cover; said ribs having portions thereof extending between said wires to position said wires; said ribs having edge portions that engage the side portion of said panel defining said subscriber terminal region.

10. The terminal of claim 8 wherein said mounting means are disposed to support said panel in spaced relation to the surface upon which said panel is mounted.

11. The terminal of claim 8 wherein hinges are provided on a surface of said panel and said cover includes arms extending therefrom and retained by said hinges to provide said pivotal mounting for said cover on said panel, and indicia means on an exposed side portion of said panel exposed between said arms.

* * * * *